June 14, 1966  F. A. HART  3,256,123
AUTOMOBILE TIRE
Filed May 28, 1962  2 Sheets-Sheet 1
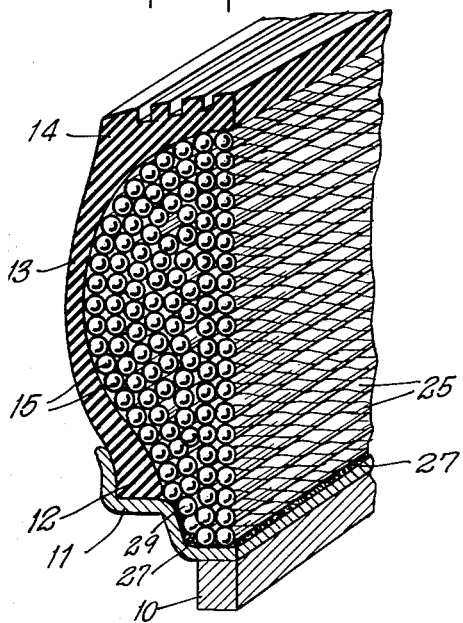
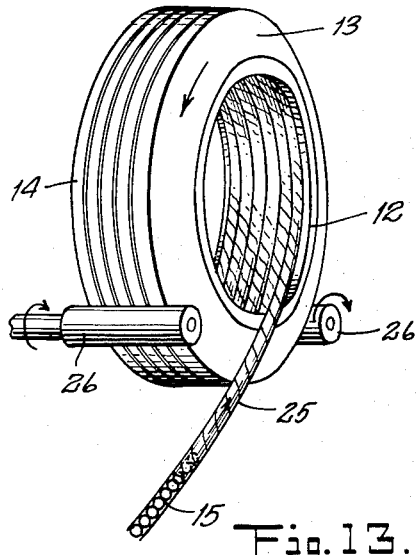
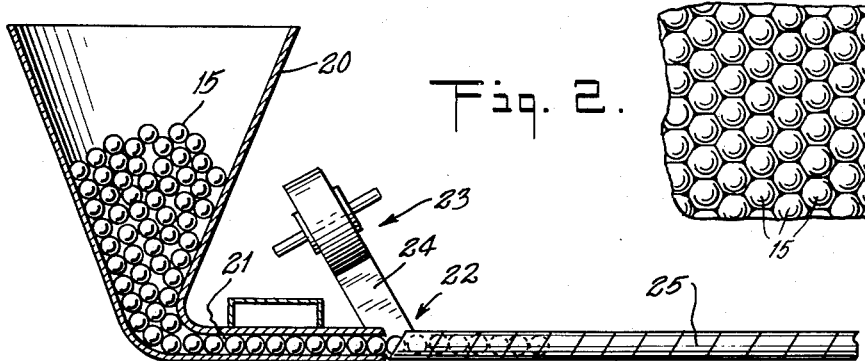
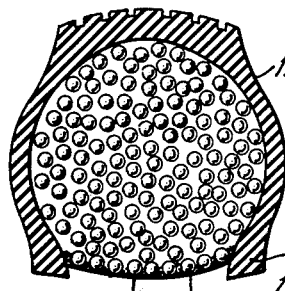
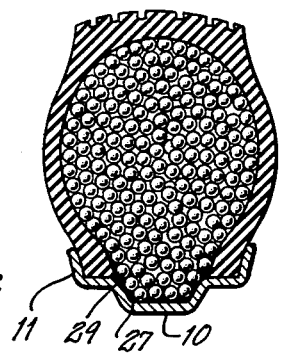
INVENTOR.
FRANK A. HART
BY
ATTORNEYS June 14, 1966  F. A. HART  3,256,123
AUTOMOBILE TIRE
Filed May 28, 1962  2 Sheets-Sheet 2
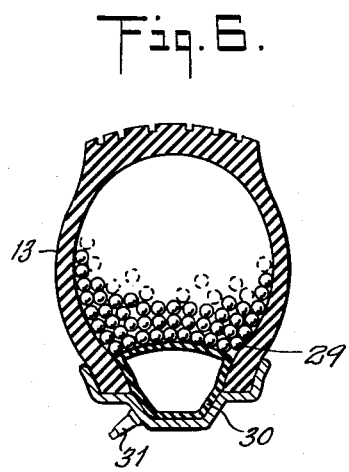
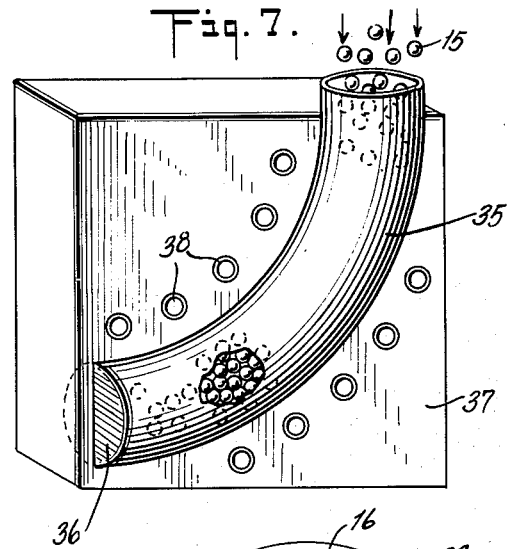
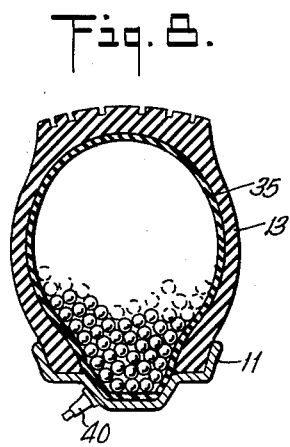
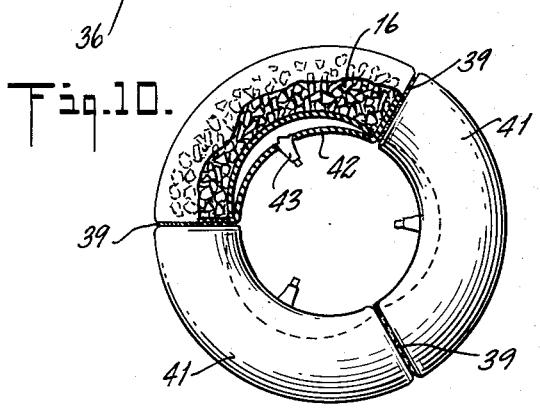
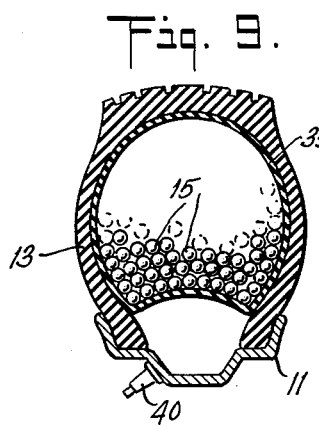
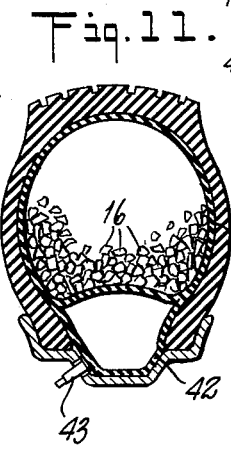
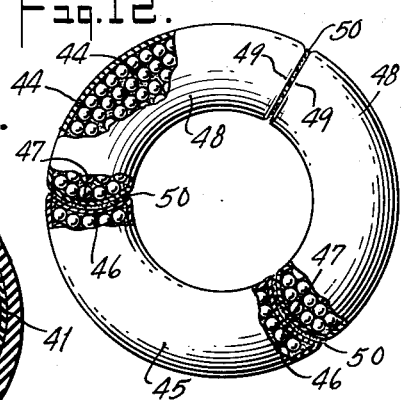
INVENTOR.
FRANK A. HART
BY
ATTORNEYS

United States Patent Office 3,256,123
Patented June 14, 1966

3,256,123
AUTOMOBILE TIRE
Frank A. Hart, 6032 Liebig Ave., Bronx 71, N.Y.
Filed May 28, 1962, Ser. No. 198,126
3 Claims. (Cl. 156—110)

This invention relates to pneumatic tires and/or tubes for vehicles such as automobiles, trucks, plows, cycles, and the like, and is more particularly directed to an improved tire construction that will substantially reduce the possibility of flats and blowouts in pneumatic tires.

An important factor in the large number of accidents that occur to automobiles is the failure of the tire due to wear, to an inherent weakness in its structure, or to a road hazard that quickly terminates its usefulness. At the speeds at which cars are driven today, a puncture or a blowout can cause serious damage and threaten the lives of the car occupants and those of others in the proximity of the accident. The industry has endeavored to cut down this loss of life and property by constantly improving the construction of the tire and by making the tire less subject to road hazards through the use of double walls and other features. While the improvements made by the art have gone a long way in accomplishing their intended purpose, the problem remains a serious one and cannot be considered as having been solved.

It is the principal purpose of the present invention to provide an improved tire construction which will substantially eliminate the possibility of a flat occurring as the result of a puncture or blowout.

The advantages of the tire of this invention, as well as the novel features of construction thereof, will become apparent from a perusal of the following description, when read in connection with the accompanying drawings, in which FIG. 1 is a sectional view, in perspective, of a portion of an automobile tire constructed in accordance with the invention;

FIG. 2 is a schematic view illustrating how the interior elements or filler of the tire may be constructed;

FIG. 3 is a perspective view showing how the tire filler may be incorporated into the body of the tire;

FIG. 4 is a sectional view of the tire after the operation shown in FIG. 3 has been completed;

FIG. 5 is a sectional view showing the tire of FIG. 4 mounted on a tire rim;

FIG. 6 is a view similar to FIG. 5 but showing the tire additionally provided with an inner tube;

FIG. 7 is a perspective view showing the manner in which a segment of an inner tube may be constructed in accordance with the invention;

FIG. 8 is a section showing the inner tube of FIG. 7 in position within a tire casing that is mounted on a tire rim;

FIG. 9 is a view similar to FIG. 8 and shows the condition of the inner tube when air is applied into the assembly through the tire rim;

FIG. 10 is a side elevational view, partly in section, of a segmented inner tube additionally provided with auxiliary inner tubes for air;

FIG. 11 is a sectional view of a tire provided with the inner tube shown in FIG. 10 and mounted on a tire rim;

FIG. 12 is a side elevational view, partly broken away, of another form of segmental inner tube embodying the invention; and FIG. 13 is an enlarged detail illustrating the shape assumed by the balls when in the tire.

In the drawings, the reference numeral 10 indicates generally the usual automobile wheel felly upon which is mounted a tire rim 11. As is indicated in FIG. 1, the rim 11 is of the clincher type and is adapted to receive the usual clincher beads 12 of a pneumatic tire casing 13. The tire 13 may be of any suitable construction and is provided with a tread 14 of any preferred design. Instead of being provided with the usual inner tube, the tire casing 13 is provided with the filler construction of this invention.

As is shown in FIGS. 1 to 3 of the drawings, a tire filler embodying the invention is constituted of a multiplicity of small elements which may be spherically shaped, as indicated by the balls 15 shown in such figures, or may have any other suitable shape or shapes, as is indicated by the variably shaped elements 16 shown in FIG. 11 of the drawings. Regardless of the shape of the elements, each of such elements is constituted of a flexible, resilient material such as rubber, suitable synthetic materials, etc., and is formed to define a closed inner chamber. Thus, the balls 15 are hollow balls, in the nature of hand balls, but preferably smaller in diameter, such as for example, one inch diameter, more or less. The interior chamber of each of the small, elastic hollow elements is filled with any suitable gas at any desired pressure dependent on the uses to which the tire in which it is incorporated is to be put, or on the physical characteristics which it is desired the tire shall have or display in the usage thereof. $CO_2$ or any suitable inert gas such as helium may be employed for this purpose to prevent overheating of the tire.

If the configuration of the elastic elements is such that some difficulty may be encountered in handling the same when loading a tire with such elements, the elastic elements may be first incorporated in a carrier, such as a tube, or a tube segment, or any other suitable means, to facilitate such loading operation. Thus, when hollow elastic balls 15 are employed as the elastic elements, such balls may be discharged into a hopper 20, in FIG. 2, constructed to feed a line 21 of such balls to a wrapping station 22 where suitable known means 23 are provided to spirally wind a strip 24 of suitable material around the line 21 of balls as the latter emerges from the hopper. The continuous line of balls emerging from the hopper therefore will be packaged in a spirally wound tubing 25 which may be fed directly to a tire casing 13 or from which may be obtained a length of tubing sufficient to fill such tire casing or shorter lengths of such tubing if they are found easier to handle. The strip 24 may be made of any suitable material capable of holding the balls in their aligned relation until they are loaded into the tire casing. Thus, the strip 24 may be made of paper, of a thin open mesh fabric such as cheesecloth or gauze which will enable the balls to be connected together, as will hereinafter be explained. The strip 24 may be provided with adhesive to enable the tube 25 to retain its form if it is subject to substantial handling before placement in the tire casing.

In filling the tire casing 13, it may be supported on a pair of rollers 26, 26 and rotated in the manner indicated in FIG. 3, to facilitate the filling operation. As is indicated in FIGS. 3 and 4, this filling operation is carried out while the beads 12 of the tire casing are spread apart and until the interior area defined by such spread casing is completely filled with the wound tubing. It is preferred, if the loaded tubing is of a single length, to have the ends thereof at approximately the same location on the tire in order to minimize unbalancing of the tire. If a plurality of sections of the tubing are used, it is preferable also, to place the inner ends thereof in aligned opposed relation to the same purpose. The wound tubing is then sealed in position in the tire casing by a layer 27 of any suitable elastic or rubber cement.

It may be found desirable to have the balls 15 contained in the tire under a given pressure. Such pressure may be attained by subjecting the balls to pressure, or by controlling the temperature of the balls, or both. The balls may be subjected to a predetermined temperature as they are being wrapped by the strip 24, as the tubing is being fed to the tire casing, or during the loading operation. Thus as is indicated in FIG. 2 of the drawings, the balls, as they are being fed in aligned relation toward the discharge end of the hopper 20, may be passed through a suitable cooling device 28 capable of substantially reducing the temperature of the balls to a given degree and consequently the pressure of the gas in the cavities of the balls a predetermined amount. The cooled balls are immediately wrapped in the strip 24 which restricts the expansion of the elastic material of the balls before they return to room temperature and consequently causes an increase in the pressure of the confined gas therein. As above indicated the same results may be accomplished by passing the filled tubing 25 through a similar cooling device as it is being fed into the tire casing, and/or the filling of the tire casing may be accomplished in a chamber, or room, whose pressure is increased and whose temperature is decreased considerably.

When the tire casing has been filled as aforesaid with the elastic members and the latter sealed in position therein by the rubber sealing layer 27, it may be subjected to a vulcanizing treatment to permanently seal together all of the coils of tubing 25 which form the last or inner layer 29 in FIG. 4 of the tire filler. The finished tire when mounted on the tire rim 11 and returned to normal atmospheric temperature and pressure will assume the cross-sectional configuration shown in FIGS. 1 and 5. It will be readily understood, that with such a tire construction, any puncturing object which may penetrate through the wall of the tire casing, will affect only one or a small group of the elastic elements, so that the tire will be substantially unaffected and will be enabled to perform its functions in the usual manner. Also with such a construction, any possibility of a blowout can be practically eliminated especially if the pressure of the gas in the elastic elements is relatively low.

Instead of filling the tire casing 13 completely with the wrapped elastic elements, as above described, such casing may be only partially filled with such elements, and an inner rubber tube 30, in FIG. 6, inserted in the remaining space. The inner tube 30 preferably seals the coils of wound tubing in position in the tire casing in the manner of the sealing layer 27 and may affect such sealing arrangement either directly with the coils of the last or inner layer 29 of the filler, as shown in FIG. 6, or through a layer of rubber cement such as the layer 27 of FIG. 4. This sealing arrangement is preferably effected by a vulcanizing treatment of the tire after the inner tube has been properly placed in position in the tire so that such tube, filler and tire casing are permanently connected together. When the tire is placed on a wheel, and the inner tube inflated through the usual air valve 31, with which such inner tube is provided, it will assume a configuration in cross-section somewhat in the manner shown in FIG. 6.

As has been previously indicated, the elastic elements may be packaged in arcuately-shaped segments of rubber rather than in a special tubing, for handling in the stuffing or filling of a tire casing. These segments may form any desired portion of the circular area defined by the tire casing and preferably should be of equal weight. Preferably three or more of such segments of equal weight should be utilized in filling a tire. As is indicated in FIG. 8, each of such segments 35 has a cross-sectional area substantially equal to the inside cross-sectional area of the tire casing 13. When the tire casing is unmounted, the segments 35 fill such casing in the manner of the tubing 25 shown in FIG. 1 and close the inner side of the tire casing substantially in the same manner as the sealing layer 27 of such figure. The showing of FIG. 8 therefore is comparable to that of FIG. 5 for the tire with the spiral tube filling in which the finished tire is mounted on the tire rim 11. As is shown in FIG. 7, each of the segments 35 comprise an arcuately shaped tubular body portion that is closed at one end by a disk shaped end wall 36 to form a container for the elastic elements 15 to be stuffed therein. The segment 35 may be filled by placing it in a suitable mold 37 provided with suitable cooling means 38 for reducing the temperature of the elements 15 and consequently the pressure of the gas therein, in the manner of the cooling device 28 in FIG. 2. When the segment 35 has been completely filled with the elastic elements 15 inserted therein in a haphazard manner and if desired under a suitable pressure, a cover disc similar to disc 36 is adhered to the open end of the segment thereby permanently sealing the elements 15 therein.

It will be understood that when the segments 35 are inserted into a tire casing, they will be placed therein in aligned relation with the end walls 36 thereof in abutting relation. Preferably adjacent end walls of the segments are adhered together by layers of elastic cement such as the rubber cement layers 39 shown in the embodiment of FIG. 10. It is within the contemplation of the invention to subject the complete tire to a vulcanizing treatment to more securely bond the segments in position in the tire casing. As is shown in FIGS. 8 and 9, the rim 11 on which the tire is mounted may be provided with the usual type of air valve 40 enabling air to be pumped into the tire between the segments 35 and such tire rim. The compressed air will compress the segments in the manner shown in FIG. 9 and consequently the elastic elements 15 to place the confined gas in such elements under increased pressure. This pressure can be controlled in the usual manner to provide the tire with any given pressure. It will be understood that in such construction, before the tire is placed on the rim 11 a sealing fluid is provided on either the tire or the rim or both to form a hermetic seal between the two.

FIG. 10 shows a tire casing filler composed of segments 41 substantially similar to segments 35, but each additionally provided with inner tube sections 42 formed on the inner periphery thereof and having suitable air valves 43. As will be seen from a comparison of FIGS. 9 and 11, the segments 41 under air pressure will assume a configuration substantially similar to the segments 35, but the air will be confined in each of the inner tubes 42 attached to such segments 41.

As has been previously noted the segments 41 are filled with elastic elements of various shapes, each of which can be utilized alone in each of the embodiments herein disclosed. When the tire is inflated to the proper pressure, the elastic elements will become deformed to some extent and as a result more firmly interlocked together to provide, in effect, a unitary elastic mass within the tire. For example, if the elastic elements are in the form of the balls 15 they will assume a shape somewhere between a sphere and hexagon, as indicated in FIG. 13, and become interlocked with one another. The elastic elements in the segments may also be connected together by a suitable elastic adhesive 44 in FIG. 12, such as rubber cement, or a suitable rubber compound which may be vulcanized to effect a solid rubber mass provided with confined gas filled chambers. As is also shown in FIG. 12 the segments may be constructed so that their ends interlock in assembled position in the tire casing. Thus the segment 45 shown in such figure may have concavely shaped end walls 46, 46 adapted to receive the convexly formed end walls 47, 47 provided on one end of each of the segments 48, 48. The other end walls 49, 49 of segments 48, 48 are flat to enable ready assembly of the segments. The three segments may then be permanently bonded together by the rubber cement layers 50, 50, 50.

While I have hereinabove described and illustrated in the drawings, preferred embodiments of my invention, it will be apparent to those skilled in the art that various changes may be made therein without departing from the spirit of the invention or the scope of the appended claims.

I claim:
1. The method of making a pneumatic tire which comprises taking a plurality of separate elastic elements, each of which is constituted of a resilient material formed to provide a closed chamber and a gas contained in said chamber, and packaging such elements in carrier means capable of being inserted into the casing of a finished pneumatic tire having an inner tube opening, said elastic elements being packaged together by feeding them in aligned relation to a wrapping station and at such station wrapping a strip of material about said aligned elements to confine the latter in a tubing of such strip material, then inserting the elements packaged in such carrier means through such inner tube opening of a finished, dismounted tire by feeding such tubing progressively into the tire casing until such packaged elements completely fill the inside space of the tire casing defined by that portion thereof which is subjected to road hazards and wear, and then securing such packaged elements in such space of the tire.
2. The method set forth in claim 1, including the step of rotating the tire while feeding the tubing thereinto.
3. The method set forth in claim 1, including the step of cooling the elastic elements to reduce their temperature substantially prior to their being wrapped in said strip of material at such wrapping station.

References Cited by the Examiner

UNITED STATES PATENTS

| | | | |
|---|---|---|---|
| 584,498 | 6/1897 | Ettinger | 152—317 |
| 644,576 | 3/1900 | Brady | 152—317 |
| 1,152,779 | 9/1915 | Behm et al. | 152—317 |
| 1,313,749 | 8/1919 | Small | 152—317 X |
| 1,396,170 | 12/1921 | Emeno | 152—317 X |
| 1,415,140 | 5/1922 | Beckman | 152—317 X |
| 1,585,837 | 5/1926 | Eiker | 156—113 |
| 1,643,848 | 9/1927 | Hibbert | 156—113 |
| 1,823,566 | 9/1931 | Maranville | 156—113 |
| 2,273,283 | 2/1942 | Pfeiffer | 156—113 |
| 2,444,150 | 6/1948 | Best | 156—145 |
| 2,451,172 | 12/1948 | Nies | 152—310 |
| 2,470,990 | 5/1949 | Kennedy | 156—145 |

FOREIGN PATENTS

| | | |
|---|---|---|
| 32,665 | 4/1908 | Austria. |
| 526,873 | 9/1940 | Great Britain. |

EARL M. BERGERT, *Primary Examiner*.

HAROLD ANSHER, ALEXANDRIA WYMAN, *Examiners*.